United States Patent
Nishiura

(10) Patent No.: US 10,695,982 B2
(45) Date of Patent: Jun. 30, 2020

(54) THREE-DIMENSIONAL IMAGE FORMING SYSTEM, COMPUTER-READABLE RECORDING MEDIUM, AND THREE-DIMENSIONAL STRUCTURE

(71) Applicant: CASIO COMPUTER CO., LTD., Shibuya-ku, Tokyo (JP)

(72) Inventor: Fusao Nishiura, Iruma (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 234 days.

(21) Appl. No.: 15/793,468

(22) Filed: Oct. 25, 2017

(65) Prior Publication Data

US 2018/0178450 A1    Jun. 28, 2018

(30) Foreign Application Priority Data

Dec. 22, 2016  (JP) .................................. 2016-250096

(51) Int. Cl.

| | |
|---|---|
| B29C 64/386 | (2017.01) |
| B41M 5/26 | (2006.01) |
| B32B 3/10 | (2006.01) |
| B33Y 10/00 | (2015.01) |
| B41M 7/00 | (2006.01) |
| B41M 3/16 | (2006.01) |
| B33Y 30/00 | (2015.01) |

(52) U.S. Cl.
CPC .............. *B29C 64/386* (2017.08); *B32B 3/10* (2013.01); *B33Y 10/00* (2014.12); *B41M 3/16* (2013.01); *B41M 5/26* (2013.01); *B41M 7/009* (2013.01); *B33Y 30/00* (2014.12)

(58) Field of Classification Search
CPC ......... B29C 64/386; B33Y 10/00; B32B 3/10; B41M 3/16; B41M 5/26; B41M 7/009
See application file for complete search history.

(56) References Cited

U.S. PATENT DOCUMENTS 5,355,314 A * 10/1994 Feigenbaum ......... G06F 17/509
                                                340/286.14
5,650,217 A *  7/1997 Skrivanek ................ B41M 3/16
                                                    428/174

(Continued)

FOREIGN PATENT DOCUMENTS

| JP | 08118780 A | 5/1996 |
|---|---|---|
| JP | 2001150812 A | 6/2001 |
| JP | 2013132765 A | 7/2013 |

OTHER PUBLICATIONS

Japanese Office Action dated Feb. 19, 2019 (and English translation thereof) issued in counterpart Japanese Application No. 2016-250096.

*Primary Examiner* — Mia M Thomas
(74) *Attorney, Agent, or Firm* — Holtz, Holtz & Volek PC

(57) ABSTRACT

A three-dimensional image forming system includes a high congestion area specifying unit that specifies, in print data for printing a grayscale image used to thermally expand a desired area on a thermally expandable sheet, a high congestion area which is an area having higher congestion of a density pattern included in the grayscale image than a predetermined value and a density adjusting unit that adjusts the density of the grayscale image such that the expanding height of the high congestion area is to be a desired height.

14 Claims, 19 Drawing Sheets

(56) References Cited

U.S. PATENT DOCUMENTS

| | | | | |
|---|---|---|---|---|
| 6,064,414 | A * | 5/2000 | Kobayashi | H04N 1/40031 347/172 |
| 8,643,891 | B2 * | 2/2014 | Fujita | G06K 15/186 264/132 |
| 8,643,898 | B2 * | 2/2014 | Koyama | G06T 17/20 264/132 |
| 8,995,022 | B1 * | 3/2015 | Vronsky | H01L 51/0005 358/3.06 |
| 9,264,559 | B2 * | 2/2016 | Motoyanagi | G06T 7/60 |
| 9,630,365 | B2 * | 4/2017 | Frayne | G06T 11/00 |
| 10,516,805 | B2 * | 12/2019 | Fujimoto | B32B 5/20 |
| 2012/0008151 | A1 * | 1/2012 | Al-Salman | B41J 3/32 358/1.2 |
| 2012/0182584 | A1 * | 7/2012 | Koyama | G06T 17/20 358/1.18 |
| 2013/0161874 | A1 * | 6/2013 | Horiuchi | B29C 44/022 264/415 |
| 2015/0352783 | A1 * | 12/2015 | Snyder | B29C 67/0007 264/132 |
| 2017/0072635 | A1 * | 3/2017 | El-Siblani | B33Y 10/00 |
| 2017/0144339 | A1 * | 5/2017 | Horiuchi | B29C 44/022 |
| 2018/0029300 | A1 * | 2/2018 | Batchelder | G03G 15/1625 |
| 2018/0079118 | A1 * | 3/2018 | Nishiura | B29C 44/60 |
| 2018/0178450 | A1 * | 6/2018 | Nishiura | B41M 7/009 |
| 2018/0178543 | A1 * | 6/2018 | Fujimoto | B41J 3/407 |
| 2018/0257273 | A1 * | 9/2018 | Kimura | H04N 1/4074 |

\* cited by examiner

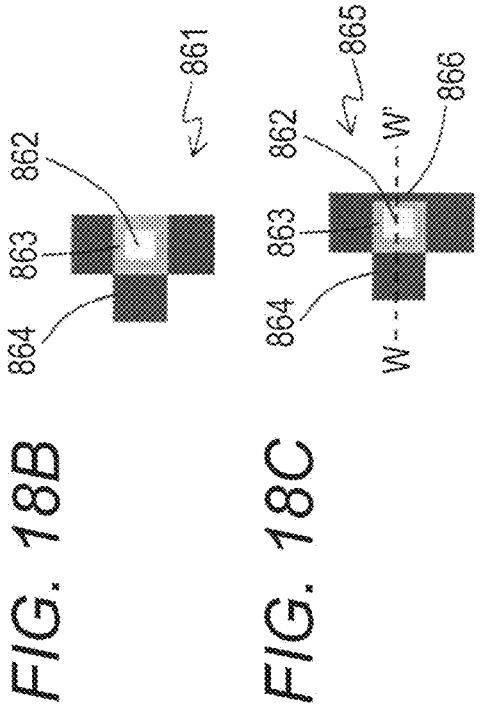
FIG. 18A
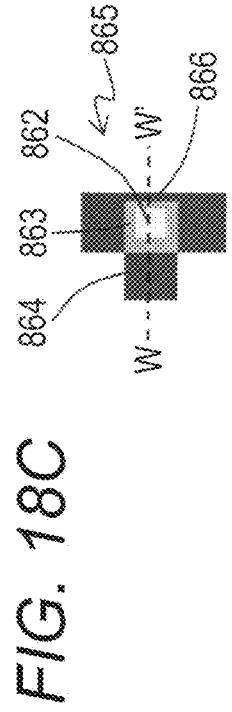
FIG. 18B
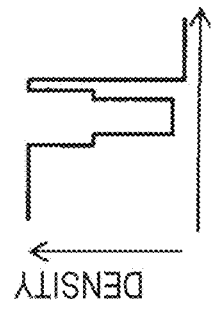
FIG. 18C
FIG. 18D
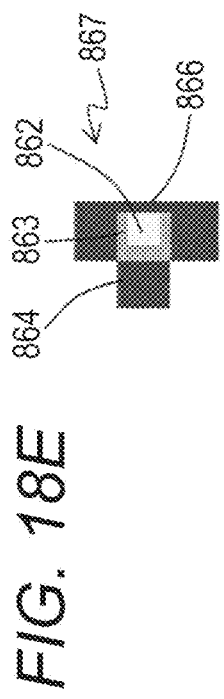
FIG. 18E
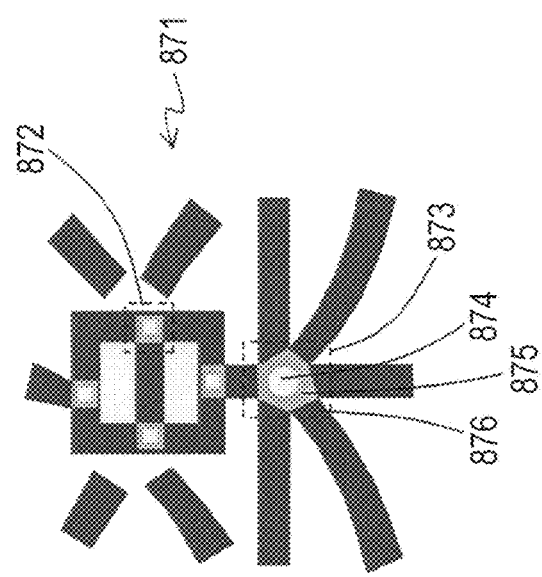
FIG. 18F

THREE-DIMENSIONAL IMAGE FORMING SYSTEM, COMPUTER-READABLE RECORDING MEDIUM, AND THREE-DIMENSIONAL STRUCTURE

CROSS-REFERENCE TO RELATED APPLICATIONS

This application is based upon and claims the benefit of priority from the prior Japanese Patent Application No. 2016-250096, filed on 1222, 2016, the entire contents of which are incorporated herein by reference.

BACKGROUND OF THE INVENTION

1. Field of the Invention

The present invention relates to a three-dimensional image forming system, a computer-readable recording medium, and a three-dimensional structure.

2. Description of the Related Art

As one of shaping techniques, there is a three-dimensional image forming technique using a foamable sheet (thermally expandable sheet) disclosed in, for example, JP 2001-150812 A. In the present technique, a three-dimensional image is formed through the following steps of printing and light irradiating. First, a grayscale image is printed with black ink (carbon black) on a foamable sheet provided with a foaming layer (front side of the foamable sheet) that expands by heating on the base material (back side of the foamable sheet). Next, a color image is printed on the foamable sheet. Finally, the foamable sheet is irradiated with light, the black ink absorbs the light according to the density of the grayscale image and generates heat, and the foaming layer thereby expands and bulges to form a three-dimensional image.

Grayscale images are mainly printed using black ink on the back side on which the base material is provided, but can also be printed on the front side. By printing an image with color ink over black ink, it is possible to enhance the appearance quality as a painting or color image.

This technique is used for creating three-dimensional images such as braille for visually impaired people, maps including characters and lines in addition to three-dimensional paintings of animals or mascots.

SUMMARY OF THE INVENTION

A three-dimensional image forming system in a first embodiment of the present invention includes a high congestion area specifying unit that specifies, in print data for printing a grayscale image used to thermally expand a desired area on a thermally expandable sheet, a high congestion area which is an area having higher congestion of a density pattern included in the grayscale image than a predetermined value and a density adjusting unit that adjusts the density of the grayscale image such that the expanding height of the high congestion area is to be a desired height.

A computer-readable recording medium in an embodiment of the present invention is a non-transitory computer-readable recording medium that stores a program causing a computer for a three-dimensional image forming system to execute the following procedures of a high congestion area specifying process for specifying, in print data for printing a grayscale image used to thermally expand a desired area on a thermally expandable sheet, a high congestion area which is an area having higher congestion of a density pattern included in the grayscale image than a predetermined value and a density adjusting process for adjusting the density of the grayscale image such that the expanding height of the high congestion area is to be a desired height.

A three-dimensional structure in an embodiment of the present invention is a three-dimensional structure formed on a thermally expandable sheet on which a grayscale image is printed, in which the density of the grayscale image printed in a high congestion area in which lines of the three-dimensional structure are congested or intersects in the three-dimensional structure is low at a center part of the high congestion area A three-dimensional image forming system in a second embodiment of the present invention includes a high congestion area specifying unit that specifies, in print data for printing a grayscale image used to thermally expand a desired area on a thermally expandable sheet, a high congestion area which is an area having higher congestion of a density pattern included in the grayscale image than a predetermined value and a density adjusting unit that adjusts the density of the grayscale image such that a difference of an expansion height corresponding to the density pattern between the high congestion area and a low congestion area which is an area excluding the high congestion area in the grayscale image is to be small.

BRIEF DESCRIPTION OF THE DRAWINGS

FIGS. 18A, 18B, 18C, 18D, 18E, and 18F are diagrams for explaining a density adjusting process according to the fourth embodiment;

DETAILED DESCRIPTION OF THE PREFERRED EMBODIMENTS

<<Height Uneven Expansion Problem of Three-Dimensional Image>>

Before describing a first embodiment, a problem that the height of a three-dimensional image becomes uneven due to excessive expansion of a foamable sheet in an area where lines and intersections are congested will be described referring to FIGS. 19A to 21B.

Figure 19A:
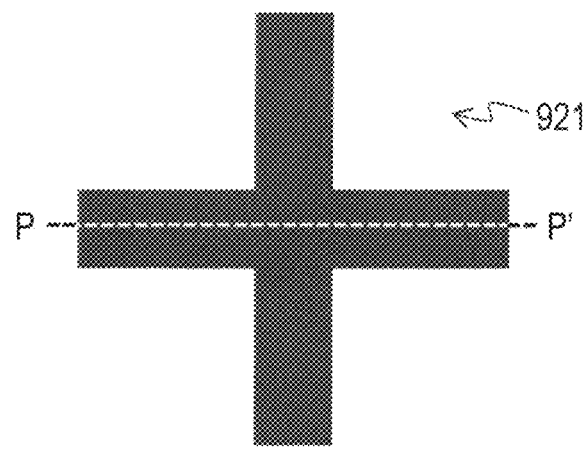
FIGS. 19A, 19B, and 19C are diagrams for explaining a problem of uneven expansion occurring in a cross-shaped grayscale image.
Figure 19B:
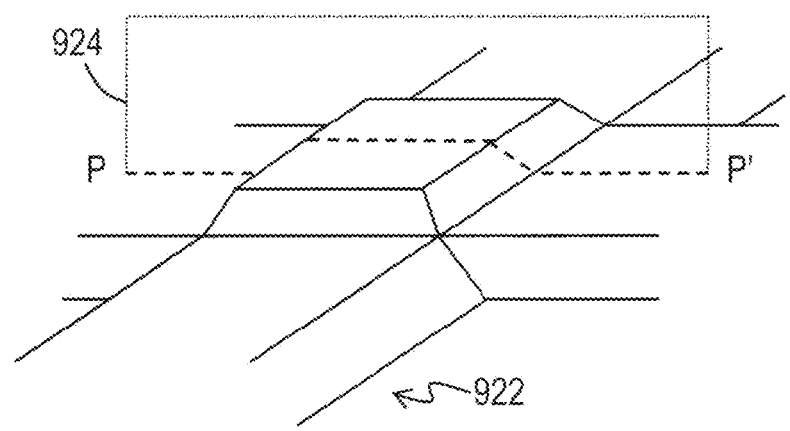
Figure 19C:
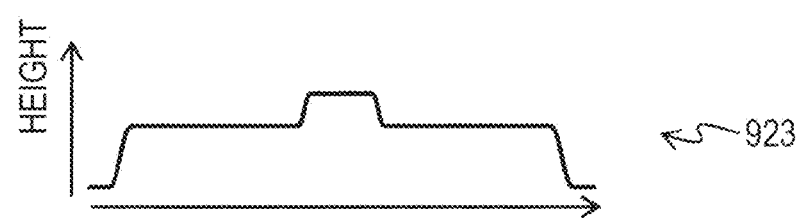

FIGS. 19A, 19B, and 19C are diagrams for explaining a problem of uneven expansion occurring in a cross-shaped grayscale image. FIG. 19A is a cross-shaped grayscale image 921 in which an uneven expansion problem occurs. FIG. 19B is a perspective view schematically showing the vicinity of the intersection of the cross of a three-dimensional image 922 that has unevenly expanded after the mirror image of the grayscale image 921 has been printed on the back side of a foamable sheet and irradiated with light. FIG. 19C is a graph 923 showing the height of the section of the foaming layer taken along the line P-P' of the grayscale image 921 (see a cross section 924 in FIG. 19B).

Although the black density of the grayscale image 921 is even, the area in the vicinity of the intersection at the center of the three-dimensional image 922 expands and protrudes from the area other than the intersection. The graph 923 shows that the vicinity of the intersection expands excessively and is higher than the other areas although the height other than the vicinity of the intersection is even, and that the three-dimensional image has the uneven height.

Figure 20A:
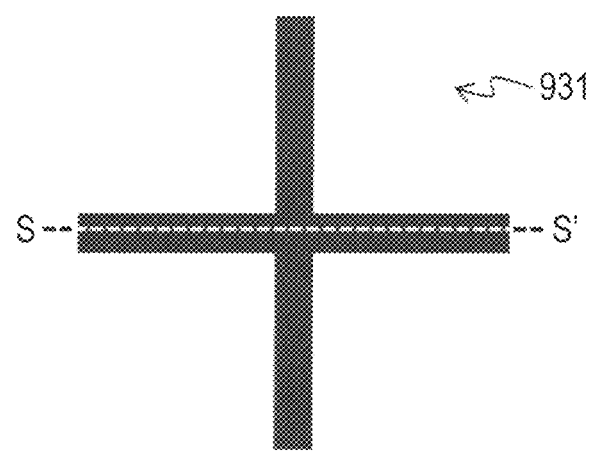
FIGS. 20A and 20B are diagrams for explaining a problem of uneven expansion occurring in a thin cross-shaped grayscale image.
Figure 20B:
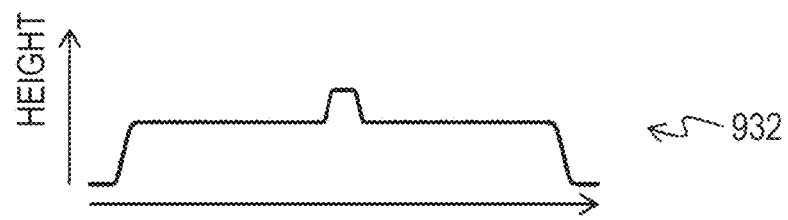

FIGS. 20A and 20B are diagrams for explaining a problem of uneven expansion occurring in a thin cross-shaped grayscale image. FIG. 20A is a thin cross-shaped grayscale image 931 in which an uneven expansion problem occurs. FIG. 20B is a graph 932 showing the height of the section of a foaming layer taken along the line S-S' of the foamable sheet that has unevenly expanded after the mirror image of the grayscale image 931 has been printed on the back side of the foamable sheet and irradiated with light. Similarly to the graph 923 (see FIG. 19C), this graph shows that the vicinity of the intersection expands excessively and is higher than the other areas although the height other than the vicinity of the intersection is even, and that the three-dimensional image has the uneven height.

Figure 21A:
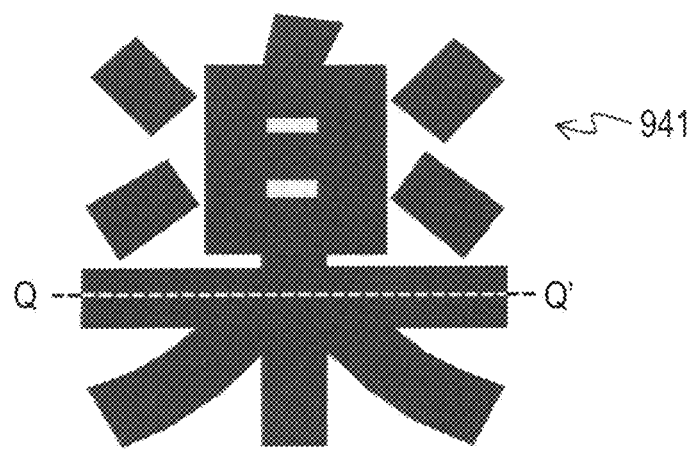
FIGS. 21A and 21B are diagrams for explaining a problem of uneven expansion occurring in a bold Chinese character having a large number of strokes.
Figure 21B:
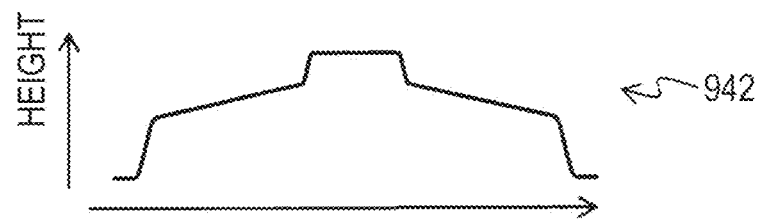

FIGS. 21A and 21B are diagrams for explaining a problem of uneven expansion occurring in a bold Chinese character having a large number of strokes. FIG. 21A is a bold grayscale image 941 in which an uneven expansion problem occurs. FIG. 21B is a graph 942 showing the height of the section of a foaming layer taken along the line Q-Q' of the foamable sheet that has unevenly expanded after the mirror image of the grayscale image 941 has been printed on the back side of the foamable sheet and irradiated with light. Four lines intersects slightly below the center of the character, and the lines are congested more than the other areas. Thus, a wider area than the area near the intersections of the graph 923 (see FIG. 19C) and the graph 932 (see FIG. 20B) has expanded, and which generates the inclination toward the center. The three-dimensional image thereby has the uneven height.

A first embodiment of the present invention for solving the above uneven expansion problems in a three-dimensional image will be described in detail with reference to the drawings. Note that, the drawings merely schematically show embodiments of the present invention to be sufficiently understood, and the present invention is not limited to the illustrated examples. If the same elements are shown in a different drawing, the same reference signs are assigned to omit redundant descriptions thereof.

<<Entire Configuration>>

Figure 1:
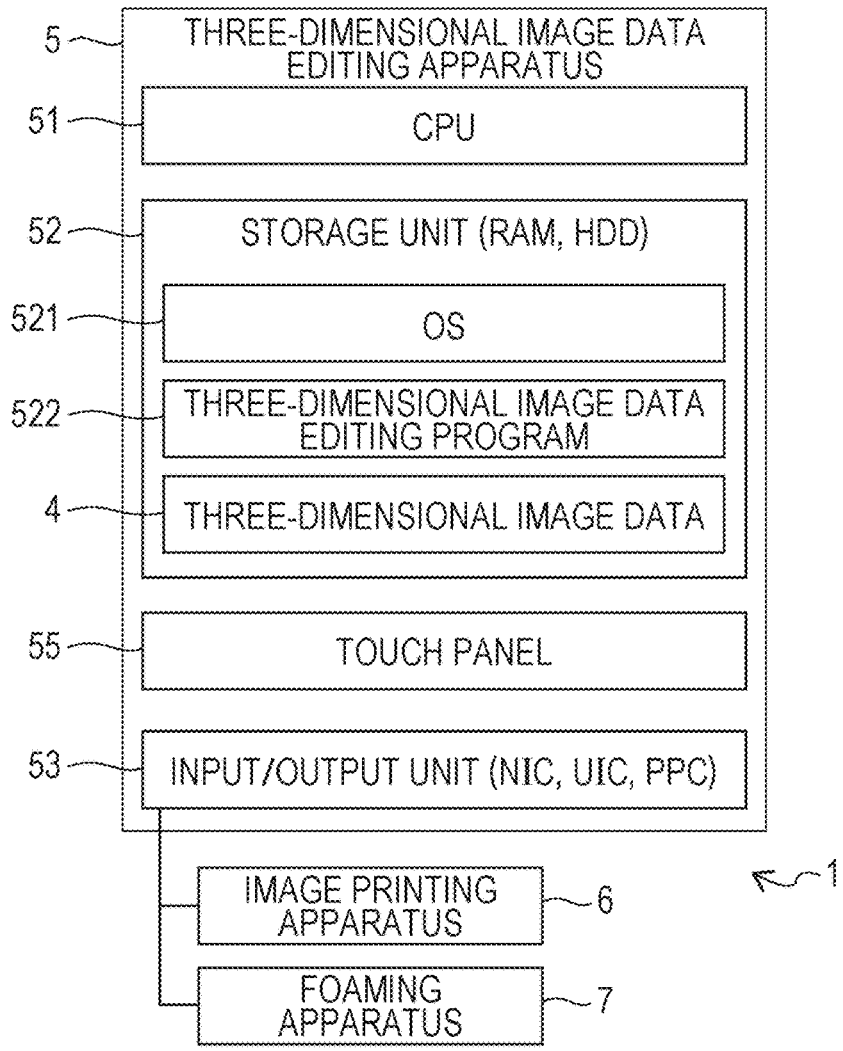
FIG. 1 is a diagram showing an entire configuration of a three-dimensional image forming system according to a first embodiment.

FIG. 1 is a diagram showing an entire configuration of a three-dimensional image forming system 1 according to the first embodiment. The three-dimensional image forming system 1 includes a three-dimensional image data editing apparatus 5, an image printing apparatus 6, and a foaming apparatus 7.

The three-dimensional image forming system 1 can create and edit three-dimensional image data 4 by a user's operation to the three-dimensional image data editing apparatus 5. The three-dimensional image data editing apparatus 5 operates the image printing apparatus 6, and the created three-dimensional image data 4 (see FIG. 2 to be described later) is thereby printed as a grayscale image (back side) and a color image (front side) on a foamable sheet 2 (see FIGS. 3A and 3B to be described later). Thereafter, the three-dimensional image data editing apparatus 5 operates the foaming apparatus 7 to irradiate the grayscale image (back side) of the foamable sheet 2 with light, and the foamable sheet 2 thereby expands to form a three-dimensional image (three-dimensional structure).

The image printing apparatus 6 prints a grayscale image on the back side of the foamable sheet 2 with black ink and prints a color image on the front side. The foaming apparatus 7 irradiates a black ink grayscale image with light and generates heat while conveying the foamable sheet 2 to foam and expand (bulge) the foamable sheet 2.

The three-dimensional image data editing apparatus 5 edits images and controls the image printing apparatus 6 and the foaming apparatus 7. The three-dimensional image data editing apparatus 5 includes a central processing unit (CPU) 51, a storage unit 52, an input/output unit 53, and a touch panel (touch panel display) 55. The three-dimensional image data editing apparatus 5 may include a display, a keyboard, and a mouse instead of the touch panel 55.

The CPU 51 causes the three-dimensional image data editing apparatus 5 to function by executing an operating system (OS) 521 and a three-dimensional image data editing program 522 stored in the storage unit 52.

The storage unit 52 is implemented by a semiconductor element such as a random access memory (RAM), a hard disk drive (HDD), or a flash memory, and stores the OS 521 of the three-dimensional image data editing apparatus 5, the three-dimensional image data editing program 522, and the three-dimensional image data 4.

The input/output unit 53 is implemented by a communication device such as a network interface card (NIC), a USB interface card (UIC), or a parallel port card (PPC), and transmits image data and exchanges control data of image printing and light irradiation to/from the image printing apparatus 6 and the foaming apparatus 7.

Figure 2:
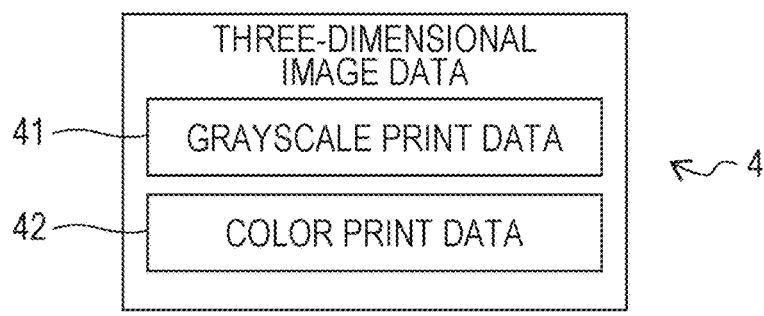
FIG. 2 is a diagram showing a data configuration of three-dimensional image data according to the first embodiment.

FIG. 2 is a diagram showing a data configuration of three-dimensional image data 4 according to the first embodiment. The three-dimensional image data 4 contains grayscale print data 41 and color print data 42. The grayscale print data 41 is data of a grayscale image expressing the height of a three-dimensional image constituted by characters, braille, straight lines, ellipses, and squares. In the grayscale image, the density is high if the foaming height of characters, braille, straight lines, ellipses, and squares is high, and the density is low if the height is low. The color print data 42 is color image data containing color information (design) on the three-dimensional image.

Figure 3A:
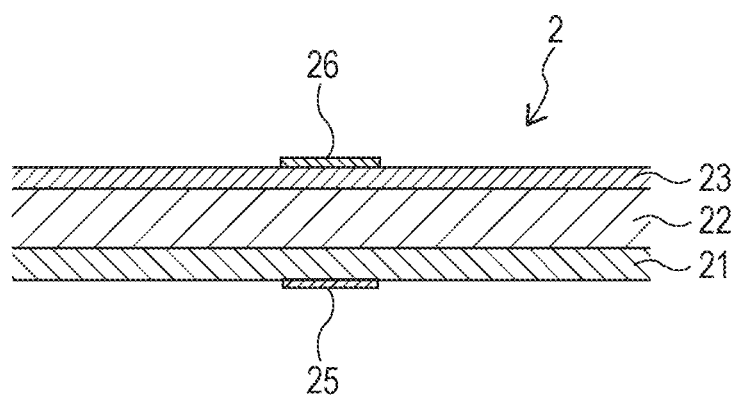
FIGS. 3A and 3B are cross-sectional views showing a structure of a foamable sheet on which a three-dimensional image according to the first embodiment is formed.
Figure 3B:
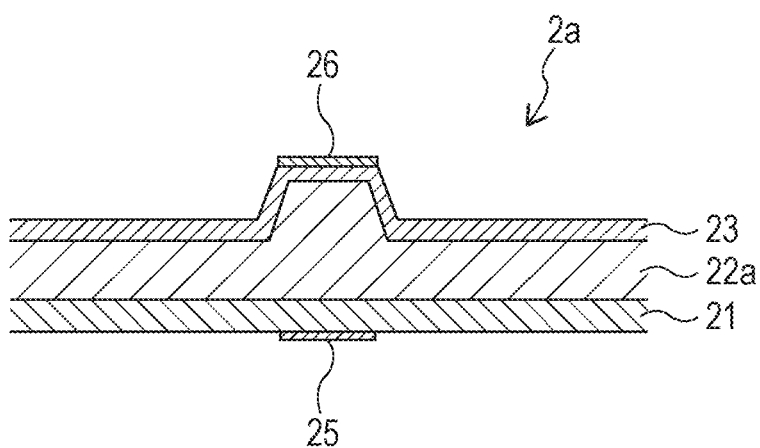

FIGS. 3A and 3B are cross-sectional views showing a structure of a foamable sheet 2 (thermally expandable sheet) on which a three-dimensional image according to the first embodiment is formed. FIG. 3A is a cross-sectional view of the foamable sheet 2 before being irradiated with light and expanded, and FIG. 3B is a cross-sectional view of a foamable sheet 2a after being irradiated with light, thermally expanded, and bulged.

The foamable sheet 2 has a structure in which a base material 21, a foaming layer 22, and an ink receiving layer 23 are laminated in order.

The base material 21 is a base layer of the foamable sheet 2, and may be flat paper, cloth such as canvas, plastic panel material, or the like.

The foaming layer 22 is provided on the front side (the upper side of FIGS. 3A and 3B) of the base material 21, contains thermally expandable microcapsules, and is formed to have the even thickness using a thermoplastic resin as a binder. Although depending on the types of microcapsule and binder, when being heated to about 80° C. or higher, the foaming layer 22 foams to expand, and bulges on the front side of the foamable sheet 2 which is the opposite side to the base material 21.

The ink receiving layer 23 is formed so as to cover the front side of the entire foaming layer 22. The ink receiving layer 23 is made of a material suitable for receiving color ink used in an ink jet printer, toner used in a laser beam printer, ink of a ballpoint pen, and the like and for fixing the ink on the front side of the foamable sheet 2.

The grayscale image 25 is formed by being printed in black ink containing carbon black on the back side (lower side in FIGS. 3A and 3B) of the foamable sheet 2. The three-dimensional image data editing apparatus 5 operates the image printing apparatus 6 to perform printing. The heating temperature when the foamable sheet 2 is irradiated with light changes according to the degree of shades (density) of the image, that is, the deposition amount of carbon black per area. Heat according to this temperature propagates through the base material 21 to the foaming layer 22, and the foaming layer 22 is heated and bulges on the front side by expansion.

The color image 26 is constituted by color inks of cyan (C), magenta (M), and yellow (Y) for general printing, and is formed by being printed on the front side of the foamable sheet 2 (the upper side of FIGS. 3A and 3B) by, for example, an ink jet system. The three-dimensional image data editing apparatus 5 operates the image printing apparatus 6 to perform printing. The black color in the color image 26 is represented by mixing of the three color inks, and black ink containing carbon black is not used.

When the three-dimensional image data editing apparatus 5 operates the foaming apparatus 7, the foamable sheet 2 is irradiated with light and heated from the back side (the lower side of FIGS. 3A and 3B), and the area of the foaming layer 22a on the front side of the foamable sheet 2 corresponding to the grayscale image 25 printed on the back side expands and bulges. With such a process, a three-dimensional image of characters and patterns with an irregular expression is formed on the front side of the foamable sheet 2.

Although the grayscale image 25 is printed only on the back side of the foamable sheet 2 in FIGS. 3A and 3B, but the present invention is not limited to this example. For example, it is possible for the grayscale image 25 to be printed only on the front side of the foamable sheet 2, or on both sides of the back side and the front side. When a grayscale image is printed on the front side, the grayscale image is printed prior to a color image, and the color image is printed thereon so that the color image is visible on the front side.

When a grayscale image is printed on the front side of the foamable sheet 2, heat is directly conducted to the foaming layer 22 without passing through the base material 21, and it is possible to form a three-dimensional image with finer irregularities. However, since a color image is printed on a grayscale image printed with carbon black, the coloration can be inferior to the case of printing the grayscale image on the back side.

As described above, the three-dimensional image data 4 contains the grayscale print data 41 and the color print data 42, and the grayscale image can be printed on the front side or the back side of the foamable sheet 2. In the first embodiment, the image printing apparatus 6 prints the grayscale image 25 only on the back side as shown in FIGS. 3A and 3B.

<<Entire Process>>

Figure 4:
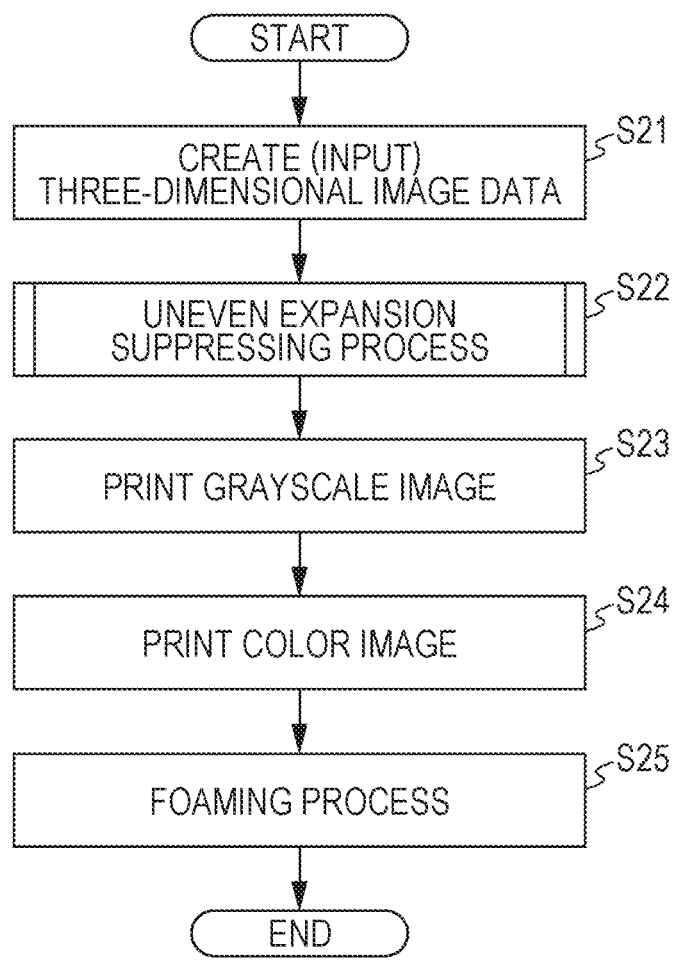
FIG. 4 is a flowchart showing an entire process for forming a three-dimensional image in the three-dimensional image forming system according to the first embodiment.

FIG. 4 is a flowchart showing an entire process for forming a three-dimensional image in the three-dimensional image forming system 1 according to the first embodiment.

Figure 5:
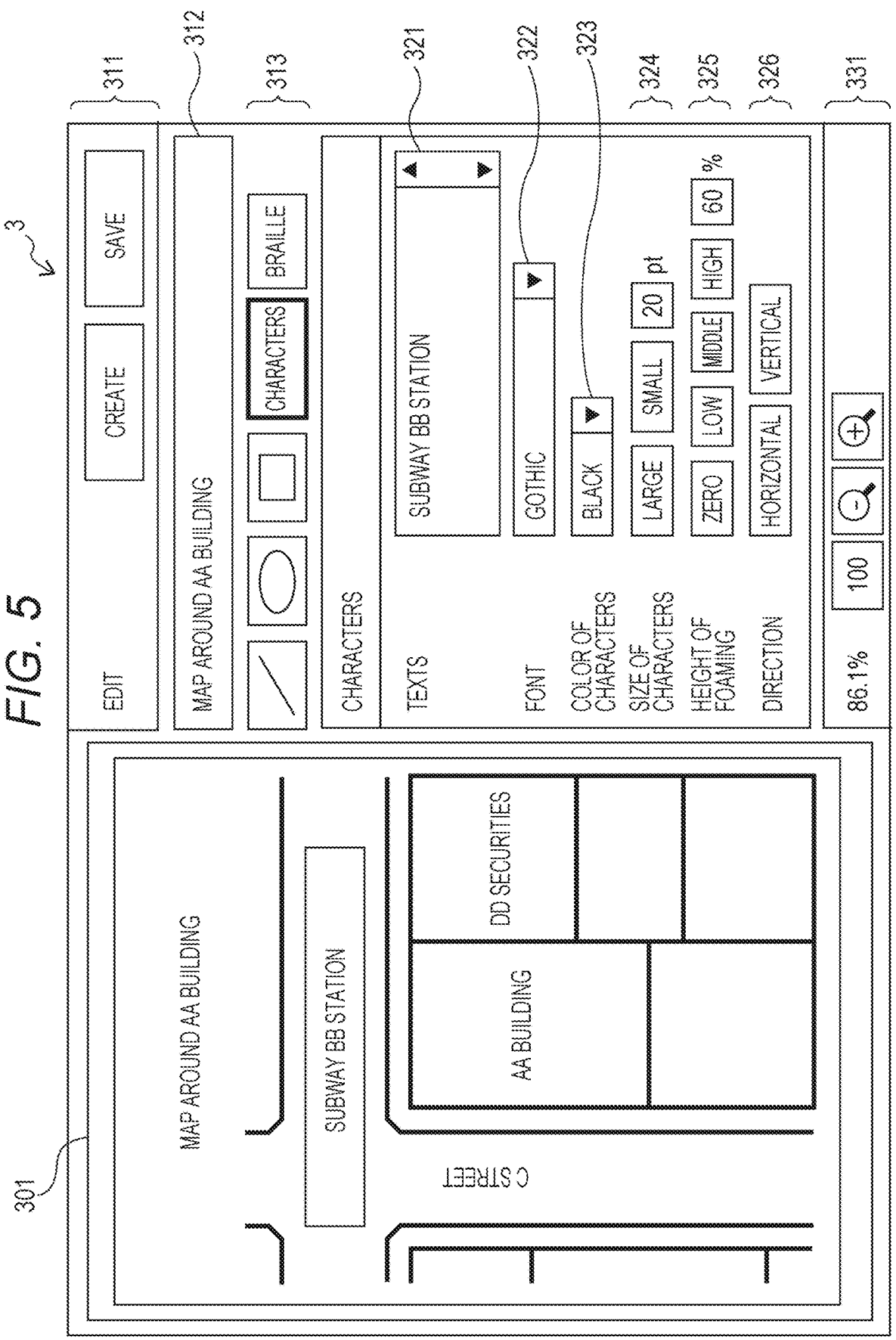
FIG. 5 is a screen layout diagram showing a configuration of an image editing screen used for creating an image of a three-dimensional image according to the first embodiment.

As the first step, a user of the three-dimensional image forming system 1 edits an image of a three-dimensional image, and the CPU 51 generates three-dimensional image data 4 (step S21). The user of the three-dimensional image forming system 1 creates desired three-dimensional image data 4 using an image editing screen 3 as shown in FIG. 5 (to be described later). The user creates the three-dimensional image data 4 while designating the foaming height to be stored as the grayscale print data 41 as well as the positions and colors of lines, characters, and the like to be stored as the color print data 42.

The image editing screen 3 is controlled by the CPU 51, and the CPU 51 stores the created three-dimensional image data 4 in the storage unit 52. The grayscale image when being stored is the grayscale image (the grayscale image 921 in FIG. 19A, the grayscale image 931 in FIG. 20A, or the grayscale image 941 in FIG. 21A) having the density according to the foaming height designated by the user, and can unevenly expands due to the tendency of density distribution.

After storing the three-dimensional image data 4, the CPU 51 performs an uneven expansion suppressing process for changing the density of the grayscale print data 41 contained in the three-dimensional image data 4 to suppress height unevenness after foaming (step S22). The uneven expansion suppressing process includes a high congestion area specifying process for specifying an area where lines and intersections are congested and a density adjusting (density correction) process for changing the density of the grayscale image. The uneven expansion suppressing process is for changing the density of the grayscale image generated in step S21 and generating a grayscale image (a grayscale image 711 in FIG. 12B, a grayscale image 731 in FIG. 14B, and a grayscale image 741 in FIG. 10 which are to be described later) for suppressing the uneven expansion, and will be described in detail later with reference to FIGS. 6 to 10.

Next, the image printing apparatus 6 prints the grayscale image subjected to the uneven expansion suppressing process in step S22 on the back side of the foamable sheet 2 (step S23). When the user sets the foamable sheet 2 on the image printing apparatus 6 and instructs the three-dimensional image data editing apparatus 5 to print the image, the CPU 51 transmits the mirror image data of grayscale image subjected to the uneven expansion suppressing process to the image printing apparatus 6 via the input/output unit 53 to instruct the printing. When receiving the instruction, the image printing apparatus 6 prints the received mirror image of the grayscale image on the back side of the foamable sheet 2. When finishing the printing, the image printing apparatus 6 notifies the CPU 51 via the input/output unit 53 that the printing has been finished.

Next, the image printing apparatus 6 prints the color image on the front side of the foamable sheet 2 (step S24). In step S23, when receiving the notification that the printing of the grayscale image has been finished, the CPU 51 transmits the color print data to the image printing apparatus 6 via the input/output unit 53 to instruct the printing. When receiving the instruction, the image printing apparatus 6 prints the color image on the front side of the foamable sheet 2. When finishing the printing, the image printing apparatus 6 discharges the foamable sheet 2 on which the grayscale image and the color image have been printed to the outside of the apparatus, and notifies the CPU 51 via the input/output unit 53 that the printing has been finished. At this point, the mirror image of the grayscale image subjected to the uneven expansion suppressing process is printed on the back side of the foamable sheet 2, and the color image is printed on the front side.

Finally, the foaming apparatus 7 foams the printed foamable sheet 2 (step S25). When the user sets the foamable sheet 2 discharged from the image printing apparatus 6 in the step S24 on the foaming apparatus 7 and instructs the three-dimensional image data editing apparatus 5 to perform foaming, the CPU 51 instructs the foaming apparatus 7 via the input/output unit 53 to perform foaming. When receiving the instruction, the foaming apparatus 7 takes in and irradiates the foamable sheet 2 set by the user with light from the back side to foam (expand) the foaming layer 22 of the foamable sheet 2, then discharges the foamable sheet 2, and notifies the CPU 51 via the input/output unit 53 that the foaming has been finished. With the above process, the three-dimensional image having even expansion and even height (a three-dimensional image 721 in FIG. 13 and a three-dimensional image 751 in FIG. 11 which are to be described later) can be obtained.

<<Image Editing>>

FIG. 5 is a screen layout diagram showing a configuration of an image editing screen 3 used for creating a three-dimensional image according to the first embodiment. The CPU 51 that functions as an image editing unit processes instructions by the user to the image editing screen 3 and controls display. An image display area 301 in which an image being edited is displayed is arranged on the left side of the screen, and buttons and pull-down menus (311 to 313, 321 to 326, and 331) used for editing are arranged on the right side of the screen.

The two buttons 311 at the upper right of the screen are a new creation button and a save button. The new creation button is pressed when the user of the three-dimensional image forming system 1 newly starts editing three-dimensional image data. When the new creation button is pressed, the CPU 51 clears the image display area 301 in preparation for editing new three-dimensional image data.

The save button is pressed when the user stores, in the storage unit 52, the three-dimensional image data 4 of the three-dimensional image displayed in the image display area 301. When the save button is pressed, the CPU 51 inquires of the user about the file name, and saves the three-dimensional image data 4 in the file having the file name stored in the storage unit 52.

The file name display area 312 is for displaying the name of the file (the title of the three-dimensional image) in which the three-dimensional image data 4 is saved.

The five buttons 313 arranged under the file name display area 312 are pressed when the type of input data is selected, and are the buttons for selecting a straight line, an ellipse, a square, a character, and braille in order from the left.

The straight line button is pressed when the user inputs a straight line. When the straight line button is pressed and the positions of the start point and the end point of a straight line are indicated in the image display area 301, the CPU 51 displays the straight line at the position.

The elliptic button is pressed when the user inputs an ellipse. When the elliptic button is pressed and the positions of the start point and the end point of the diagonal of an elliptical area are indicated in the image display area 301, the CPU 51 displays the ellipse at the position.

The square button is pressed when the user inputs a square. When the rectangular button is pressed and the positions of the start point and the end point of the diagonal line of a square are indicated in the image display area 301, the CPU 51 displays the square at the position.

A character button is pressed when the user inputs a character string. When the character button is pressed, the start position of a character string is indicated in the image display area 301, and a character string is input in a text input area 321 to be described later, the CPU 51 displays the character string at the position.

A braille button is pressed when the user inputs braille. When the braille button is pressed, the start position of braille is indicated in the image display area 301, and the pronunciation of the braille is inputted, the CPU 51 displays the row of the braille at that position.

FIG. 5 is a diagram of the screen layout when the character button (the second button from the right of the five buttons 313) is pressed, and the buttons and pull-down menus (321 to 326), and the like relating to the editing of a character string are displayed. When another button is pressed, buttons, pull-down menus, and the like relating to the button are displayed.

The text input area 321 is an area (text box) in which an input character string is input.

The font pull-down menu 322 is used when the user designates the font of a character string. When a target character string is selected in the image display area 301 and the font is designated in the font pull-down menu 322, the CPU 51 changes the character string to the selected font and displays it in the image display area 301.

The character color pull-down menu 323 is used when the user designates the color of characters. When a target character string is selected in the image display area 301 and the color of the character is designated in the character color pull-down menu 323, the CPU 51 changes the character string to the selected color and displays it in the image display area 301.

The two buttons 324 of "large" and "small" for the character size are pressed when the user changes the character size of a character string. When a target character string is selected in the image display area 301 and the "large" button is pressed, the CPU 51 changes the character string by one step large and displays it in the image display area 301. This also applies when the "small" button is pressed. The current character size is displayed small on the right of the button.

The four buttons 325 for the foaming height are pressed when the user designates the height of a character string after foaming, and are "zero", "low", "medium", and "high". The ratio of the current foam height to the maximum height is displayed on the right of the "high" button.

The two buttons 326 for the directions are pressed when the user designates the direction of a character string, and are horizontal writing and vertical writing. When a target character string is selected in the image display area 301 and the horizontal writing button is pressed, the CPU 51 changes the character string in the horizontal direction and displays it in the image display area 301. This also applies when the vertical writing button is pressed.

The three buttons 331 for the image enlargement ratio arranged at the bottom right of the screen are pressed when the user designates the enlargement ratio of the image to be displayed in the image display area 301, and are equal enlargement, reduction, and expansion. The CPU 51 displays the image at the equal enlargement when the equal enlargement button is pressed, displays the image by being reduced by one step when the reduction button is pressed, and displays the image by being enlarged by one step when the enlargement button is pressed.

The current enlargement ratio is displayed on the left of the equal magnification button.

In the first embodiment, since a black grayscale image is printed on the back side and a color image is printed on the front side, the three-dimensional image data 4 contains two pieces of image data of the grayscale print data 41 and the color print data 42. The grayscale print data 41 stored in the storage unit 52 by the CPU 51 is an image shaded according to the foaming height designated by the foaming height button 325, and the black image becomes darker as the foaming height is higher. The foaming height button 325 in the image editing screen 3 is for selecting the foaming height of a character string, and similar buttons are also available for a straight line and an ellipse to select the foaming height.

<<Uneven Expansion Suppressing Process>>

Figure 6:
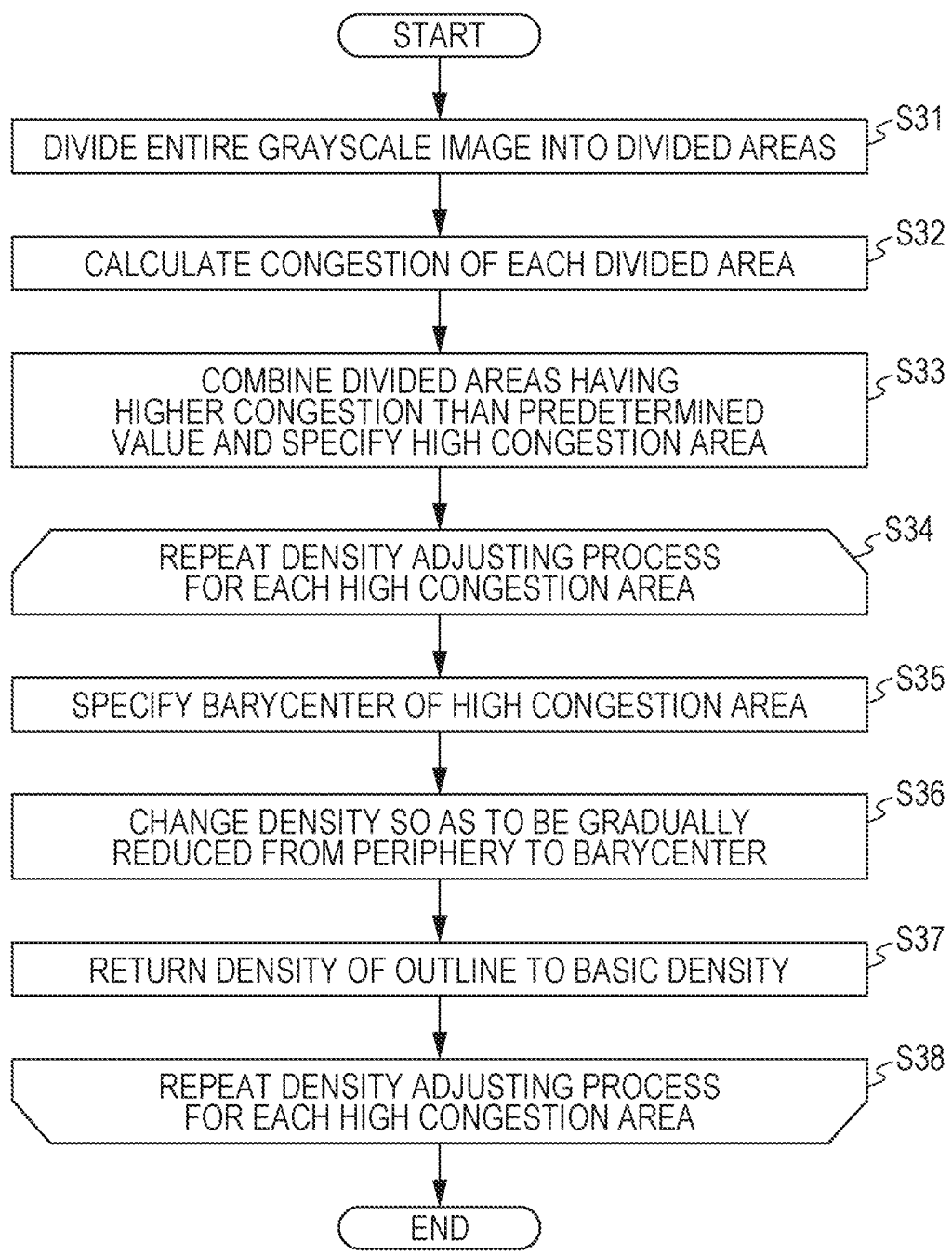
FIG. 6 is a flowchart showing an uneven expansion suppressing process according to the first embodiment.
Figure 7A:
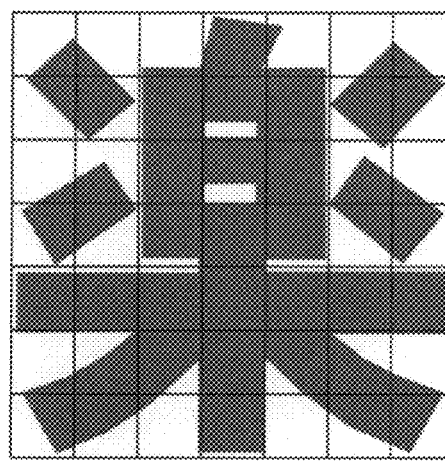
FIGS. 7A, 7B, and 7C are diagrams for explaining the details of a process for specifying a high congestion area according to the first embodiment.
Figure 7B:
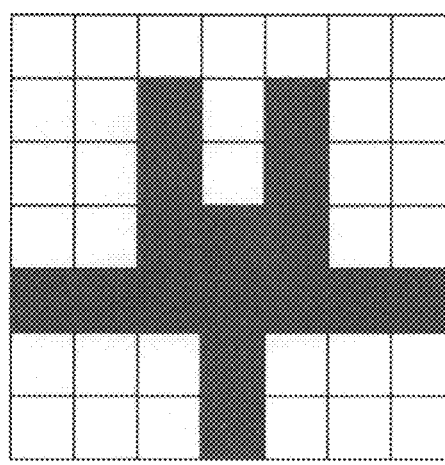
Figure 7C:
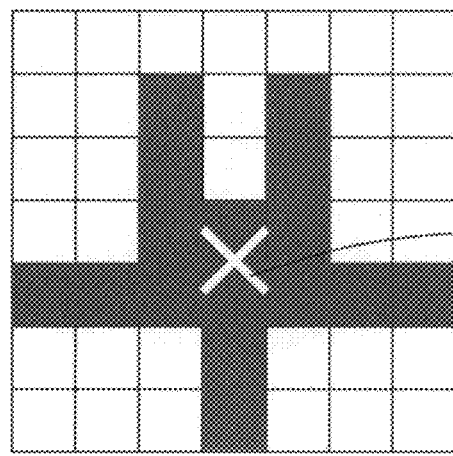
Figure 8A:
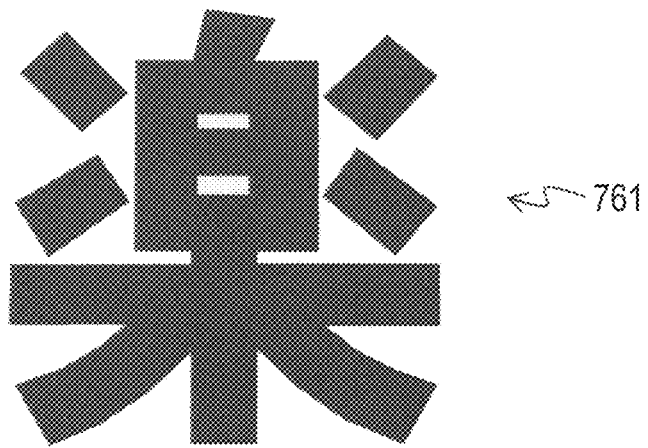
FIGS. 8A, 8B, and 8C are diagrams for explaining density adjustment according to the first embodiment.
Figure 8B:
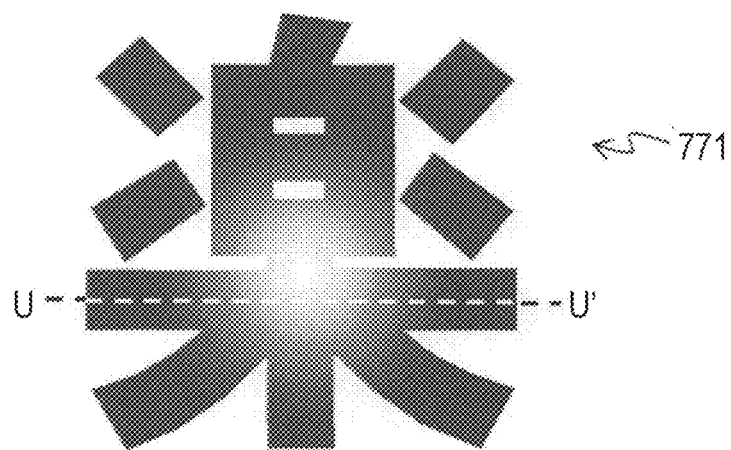
Figure 8C:
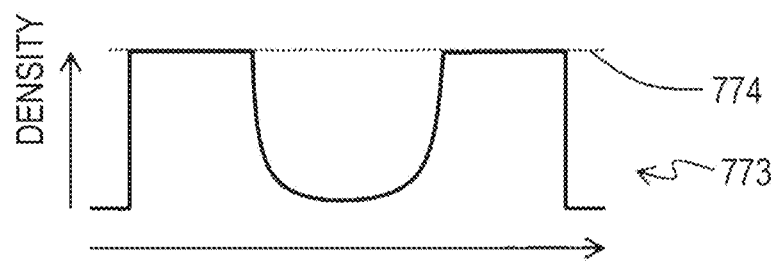
Figure 9A:
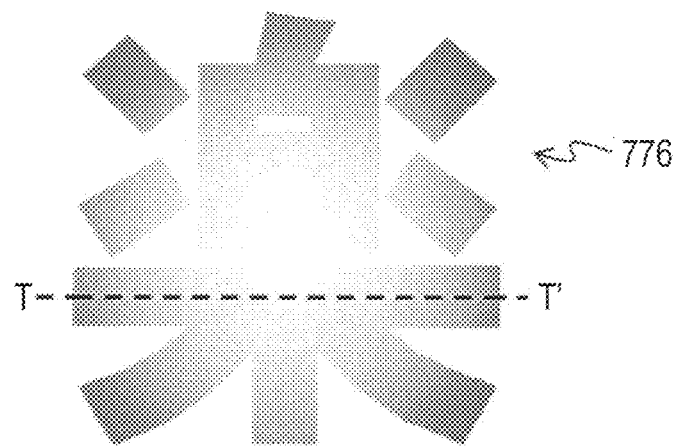
FIGS. 9A and 9B are diagrams for explaining density adjustment for a wide range according to the first embodiment.
Figure 9B:
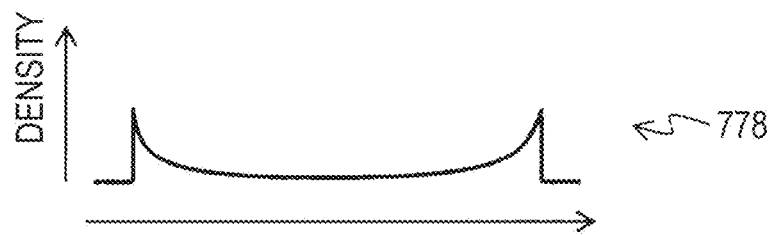
Figure 10:
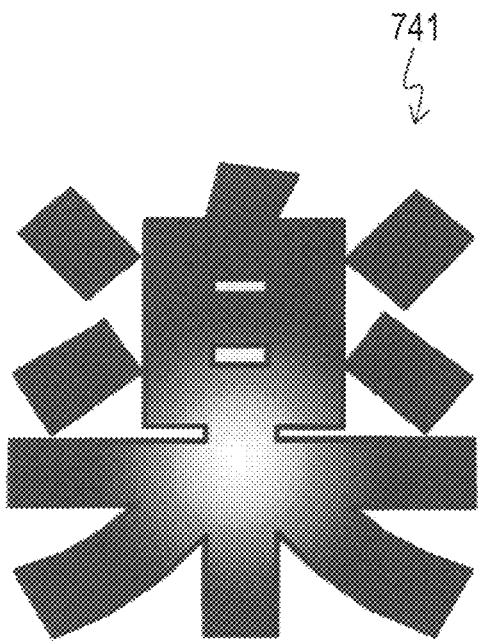
FIG. 10 is a diagram showing a grayscale image after the uneven expansion suppressing process according to the first embodiment.

The uneven expansion suppressing process performed by the CPU 51 in step S22 (see FIG. 4) according to the first embodiment will be described in detail with reference to FIGS. 6 to 10. FIG. 6 is a flowchart showing the uneven expansion suppressing process according to the first embodiment. FIGS. 7A, 7B, and 7C are diagrams for explaining the details of a process for specifying a high congestion area according to the first embodiment. FIGS. 8A, 8B, and 8C are diagrams for explaining density adjustment according to the first embodiment. FIGS. 9A and 9B are diagrams for explaining density adjustment for a wide range according to the first embodiment. FIG. 10 is a diagram showing a grayscale image 741 after the uneven expansion suppressing process according to the first embodiment.

The CPU 51 divides the entire grayscale image into divided areas having a predetermined size (step S31). FIG. 7A is an example of division when it is assumed that a character grayscale image 761 is an entire grayscale image and is divided into 49 (7×7) divided areas.

Next, the CPU 51 calculates the congestion of each divided area (step S32). In order to calculate the congestion of the divided area, the density of the grayscale image in the divided area is taken into consideration. In addition to the method for calculating the ratio of the area having a density higher than a predetermined density in the divided areas as congestion, a method for calculating the average value of densities by weighting density is also applicable.

Next, the CPU 51 combines the divided areas having congestion higher than a predetermined value to specify a high congestion area (step S33). In other words, if divided areas having congestion higher than the predetermined value are adjacent to each other, the CPU 51 combines the divided areas to form a high congestion area. There are a grayscale image having a plurality of high congestion areas and a grayscale image having no high congestion area.

FIG. 7B is a diagram showing a high congestion area 762 of the grayscale image 761. The high congestion area 762 is an area obtained by combining 16 divided areas having congestion higher than the predetermined value in the 49 divided areas.

The CPU 51 performs the density adjusting process in steps S35 to S37 to each high congestion area specified in step S33 (step S34).

As the first step of the density adjusting process, the CPU 51 specifies the barycenter of the high congestion area (step S35). FIG. 7C is a diagram showing a barycenter 764 of the high congestion area 762.

Next, the CPU 51 changes the density so that the density of the grayscale image 761 in the vicinity of the high congestion area 762 (the high congestion area and its periphery) is gradually reduced toward the barycenter (step S36). FIG. 8A is the grayscale image 761 before density change, which is the same as the image in FIG. 7A and is shown for comparison with FIG. 8B. FIG. 8B is a grayscale image 771 after the density change so that the density is gradually reduced concentrically toward barycenter 764 as the center. FIG. 8C is a graph 773 showing the density of the line U-U' of the grayscale image 771 after the density change.

The density at both ends of the line U-U' indicated by a dotted line 774 is the density of the original grayscale image 761, and the density is changed so as to be gradually reduced from this point toward the center. The density level is a high gradation used in printing, that is, many levels (gradations) such as 256 gradations, but may be 3 or 4 levels. Hereinafter, the density of the grayscale image 761 before density change is also referred to as a basic density. The basic density is determined by the foaming height set by the foaming height button 325 in the image editing screen 3 (see FIG. 5).

FIG. 9A shows a grayscale image 776 the density of which is changed so as to be gradually reduced concentrically from the range wider than the areas in FIG. 8A, FIG.

8B, and FIG. 8C toward the barycenter 764 of the high congestion area 762 as the center. FIG. 9B is a graph 778 showing the density of the line T-T' of the grayscale image 776 after the density change. In the density change shown in FIGS. 8A, 8B, and 8C, the CPU 51 gradually reduces the density from the basic density at both ends of the line U-U' toward the center. In the density change shown in FIGS. 9A and 9B, the CPU 51 reduces the density in a wider range, that is, around the entire line T-T' so that the density at both ends is lower than the basic density, and the density of the entire original grayscale image 761 is changed.

The area in which the density is changed may be widened according to the size of the high congestion area or may be widened as the basic density is higher. The area in which the density is changed may be widened according to the integrated value of the densities of the high congestion area (the sum of the densities of the pixels in the high congestion area) or the average density.

As the final step of the density adjusting process, the CPU 51 returns the density of the outline of the grayscale image 761 having a predetermined width to the basic density before the density change (step S37). The grayscale image 741 (see FIG. 10) is obtained as a result of performing the process in step S37 to the grayscale image 771 the density of which has been changed (see FIG. 8B).

As described above, the density is changed so that the point where lines are congested and the congestion of character image is high (the barycenter 764 of the high congestion area 762) as the center has a lower density, that the black density is gradually increased concentrically toward the outside, and that the outline remains having the basic density. If the density of the outline is reduced, the outline of the expanded part becomes dull, and which blurs the three-dimensional image, and the outline remains having the basic density to prevent this blurring. The process for recognizing the outline of the original grayscale image 761 and returning it to the basic density can be achieved by existing image processing techniques such as boundary tracing.

After performing the density adjusting process in steps S35 to S37 to all the high congestion areas specified in step S33, the CPU 51 completes the entire processing in FIG. 6 (step S38).

Figure 11:
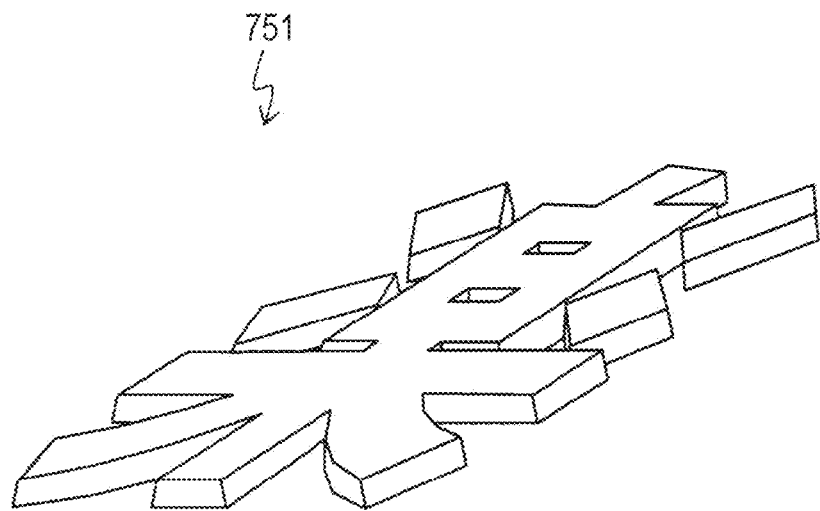
FIG. 11 is a perspective view showing a three-dimensional image that has evenly expanded after the mirror image of a grayscale image according to the first embodiment has been printed on the back side of a foamable sheet and irradiated with light.

FIG. 11 is a perspective view showing an example of a three-dimensional image 751 that has evenly expanded after the mirror image of the grayscale image 741 according to the first embodiment has been printed on the back side of the foamable sheet 2 and irradiated with light. The three-dimensional image 751 having no inclination and an even height as shown in the graph 942 (see FIG. 21B) is obtained.

Next, the density adjusting process (steps S35 to S37 in FIG. 6) in the uneven expansion suppressing process (step S22 in FIG. 4) performed by the CPU 51 to the cross-shaped grayscale image 921 (see FIG. 19A) and the thin cross-shaped grayscale image 931 (see FIG. 20A) will be described.

Figure 12A:
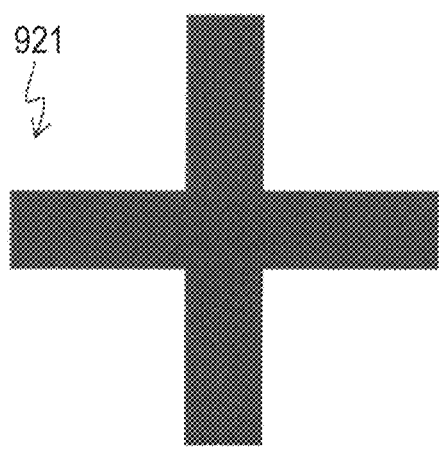
FIGS. 12A, 12B, 12C, and 12D are diagrams for explaining density adjustment of a grayscale image according to the first embodiment to evenly expand a cross-shaped grayscale image.
Figure 12B:
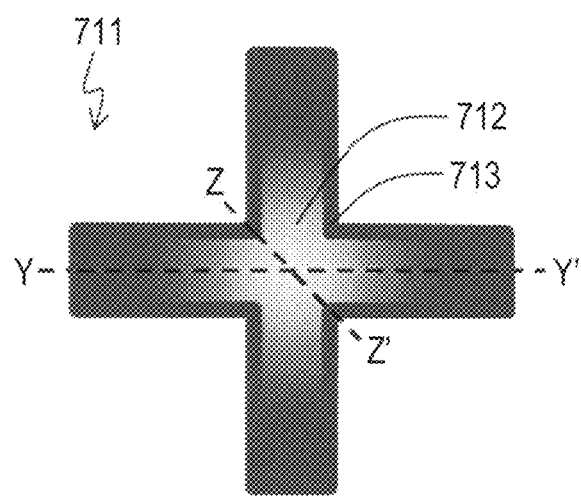
Figure 12C:
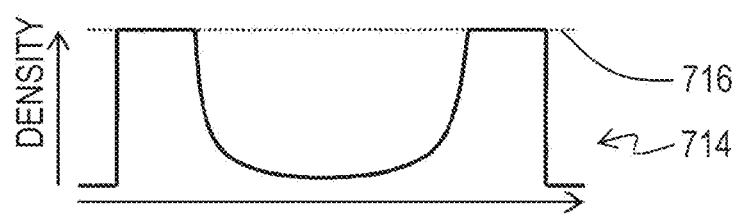
Figure 12D:
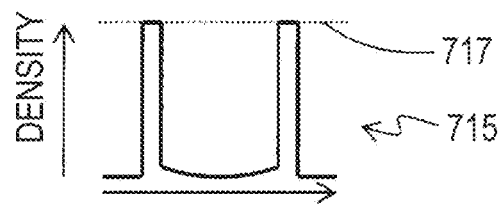

FIGS. 12A, 12B, 12C, and 12D are diagrams for explaining density adjustment of a grayscale image according to the first embodiment to evenly expand the cross-shaped grayscale image 921. FIG. 12A is the grayscale image 921 before density change, which is the same as the image in FIG. 19A and is shown for comparison with FIG. 12B. FIG. 12B is the grayscale image 711 which is the grayscale image 921 after the density adjusting process. FIG. 12C is a graph 714 showing the density of the grayscale image 711 at the line Y-Y'. FIG. 12D is a graph 715 showing the density of the grayscale image 711 at the line Z-Z'.

In the density adjustment shown in the grayscale image 711, the density is changed so that the intersection of the cross which is the barycenter of the high congestion area as the center has a lower density, that the black density is gradually increased concentrically toward the outside, and that the outline remains having the basic density. As shown by the graph 714, the density is changed so as to be increased from the low density at the center to the basic density indicated by the dotted line 716 which is the density at the both ends of the line Y-Y' through many levels inside the cross-shaped grayscale image.

The density change is unnecessary to be continuous. As shown by the graph 715 showing the density of the line Z-Z', the density may be changed so as to be gradually increased from the center of the intersection to the outside and to be the basic density indicated by the dotted line 717 at the outline discontinuously.

Figure 13:
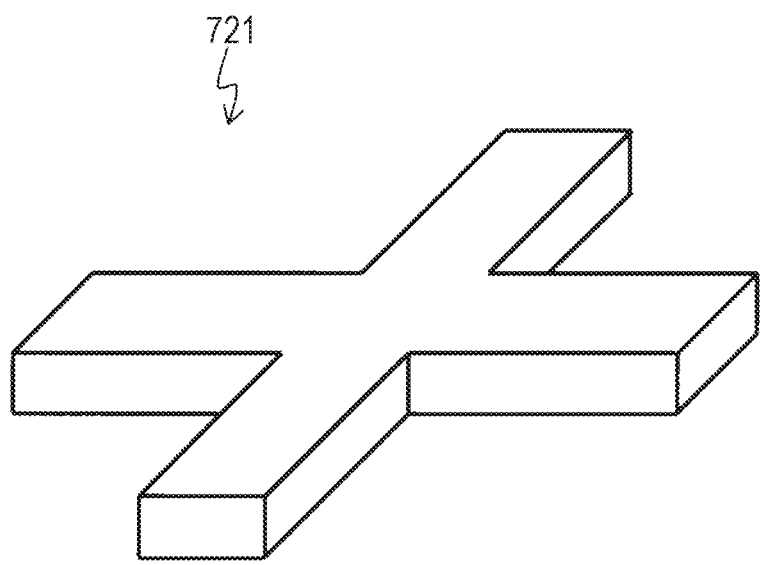
FIG. 13 is a perspective view showing an example of a three-dimensional image that has evenly expanded after the mirror image of the cross-shaped grayscale image according to the first embodiment has been printed on the back side of a foamable sheet and irradiated with light.

FIG. 13 is a perspective view showing an example of the three-dimensional image 721 that has evenly expanded after the mirror image of the cross-shaped grayscale image 711 according to the first embodiment has been printed on the back side of the foamable sheet 2 and irradiated with light. A cross-shaped three-dimensional image having no protruding area as shown in the three-dimensional image 922 (see FIG. 19B) and an even height is obtained.

Figure 14A:
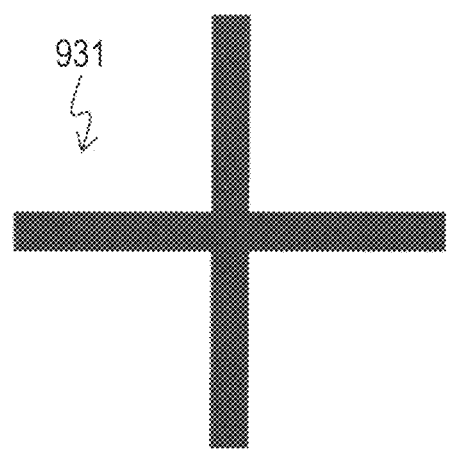
FIGS. 14A, 14B, 14C, and 14D are diagrams for explaining density adjustment of a grayscale image according to the first embodiment to evenly expand a thin cross-shaped grayscale image.
Figure 14B:
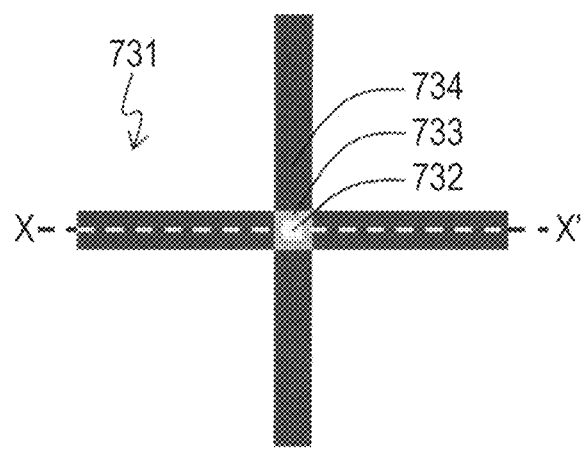
Figure 14C:
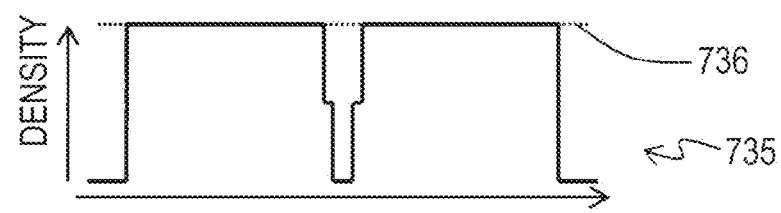
Figure 14D:
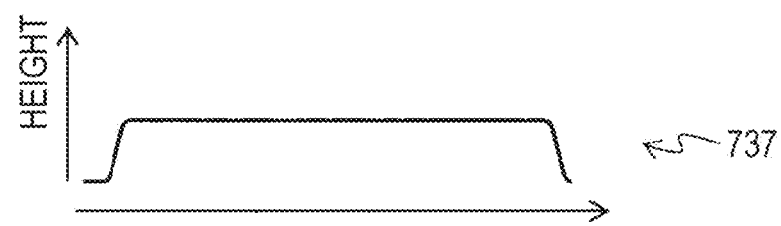

FIGS. 14A, 14B, 14C, and 14D are diagrams for explaining the uneven expansion suppressing process for evenly expanding the thin cross-shaped grayscale image 931 (see FIG. 20A) according to the first embodiment. FIG. 14A is the grayscale image 931 before density change, which is the same as the image in FIG. 20A and is shown for comparison with FIG. 14B. FIG. 14B is the grayscale image 731 which is the grayscale image 931 after the density adjusting process. FIG. 14C is a graph 735 showing the density of the grayscale image 731 at the line X-X'. FIG. 14D is a graph 737 showing the height of the section of the foaming layer taken along the line X-X' of the foamable sheet 2 that has evenly expanded after the mirror image of the grayscale image 731 has been printed on the back side of the foamable sheet 2 and irradiated with light.

The high congestion area of the grayscale image 931 is the intersection (intersection area) of the cross.

The density of the grayscale image 731 in the area other than the intersection area is the same as the density (basic density) of the grayscale image 931 before the density adjustment, but the density is different in the intersection area. The intersection area is divided into two areas by an inner rectangle, and the density is changed so as to be gradually increased in the order of an inner rectangular area 732, an intersection area 733 excluding the inner rectangular area 732, and an image area 734 other than the intersection area.

As shown by the graph 735, when the maximum density is 100%, the density of the inner rectangular area 732 is 0%, the density of the intersection area 733 excluding the inner rectangular area 732 is 25%, and the density of the image area 734 other than the intersection area (the basic density indicated by the dotted line 736) is 50%. However, the density is not limited to these values.

The grayscale image 731 is divided into the three areas (732 to 734), and the density is changed to three levels including 0%, but the number of divisions and the density levels are not limited to three areas and three levels respectively. The density may be changed so that the black density is increased sequentially from the center of the intersection area to the outside by dividing the intersection area into a larger number of areas.

Although a rectangle is used for dividing the intersection area, the shape is not limited thereto. If lines are not straight and diagonally intersect, and the intersection area is a parallelogram, the intersection area may be divided into parallelogram areas. Alternatively, the intersection area may be divided into circle or polygonal areas.

When the mirror image of the grayscale image 731 is printed on the back side of the foamable sheet 2 and irradiated with light, the foamable sheet 2 expands to a cross-shaped three-dimensional image having an even height similarly to the cross-shaped three-dimensional image 721 (see FIG. 13).

By changing the density so that the black density at the center of the intersection is low and the density is increased toward the outside similarly to the grayscale image 711 (see FIG. 12B) and the grayscale image 731 (see FIG. 14B), it is possible to suppress uneven expansion of the foaming layer at the intersection, and to obtain a three-dimensional image having an even height.

<<Modification of Uneven Expansion Suppressing Process>>

Figure 15A:
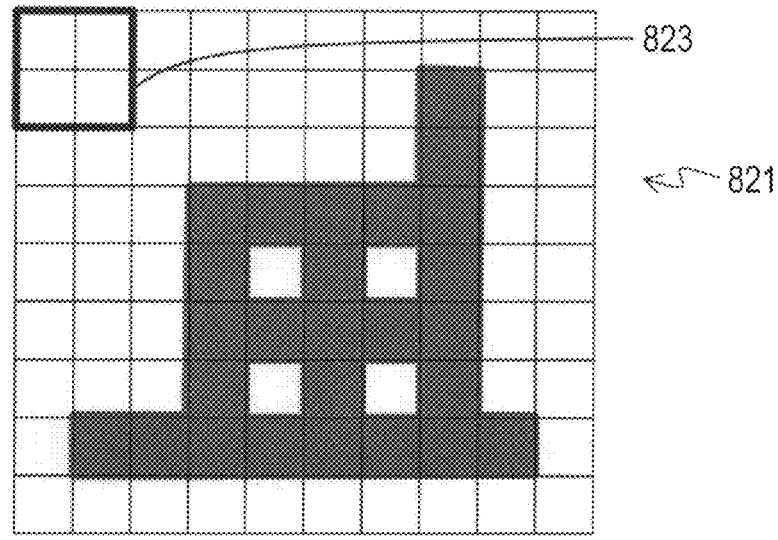
FIGS. 15A, 15B, and 15C are diagrams for explaining an uneven expansion suppressing process according to a second embodiment.
Figure 15B:
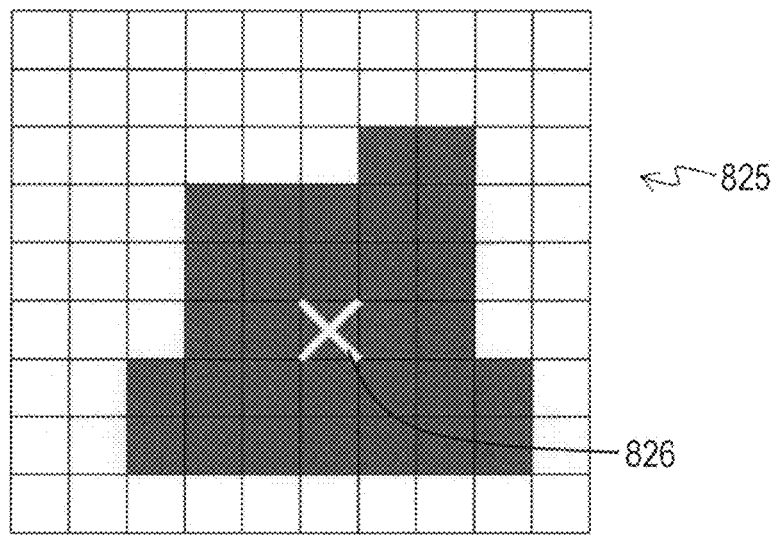
Figure 15C:
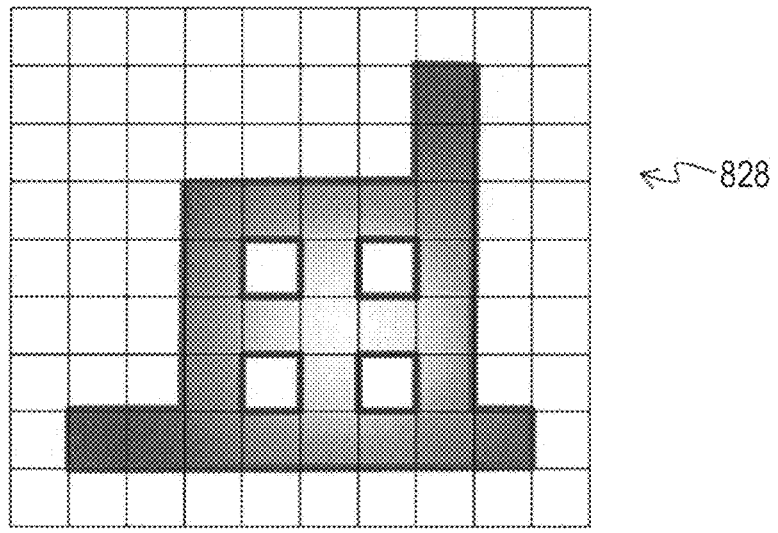

The details of an uneven expansion suppressing process in a second embodiment of the present invention will be described below. FIGS. 15A, 15B, and 15C are diagrams for explaining an uneven expansion suppressing process according to a second embodiment. FIG. 15A is a diagram for explaining specification of a high congestion area in the present embodiment, in which the entire density image is divided into rectangles (squares). FIG. 15B is a diagram showing a high congestion area 825 and its barycenter 826 in the present embodiment. FIG. 15C is a diagram showing a grayscale image 828 after the uneven expansion suppressing process in this embodiment.

The details of a process in which a CPU 51 scans a grayscale image 821 using a scanning window 823 will be described. The scanning window 823 is an area constituted by 2×2 squares and moves vertically and horizontally in units of one square. The scanning window 823 vertically and horizontally moves by a distance of one square while half the areas (2 squares) are overlapping with each other before and after the movement. As a result, the scan window passes through one square four times.

The high congestion area 825 in the second embodiment is an area obtained by combing the scanning window 823 when the area having a density higher than a predetermined value occupies ¾ or more in the scanning window 823.

The density adjusting process after the high congestion area is specified is similar to that in the first embodiment, and the grayscale image 828 is obtained.

Figure 16A:
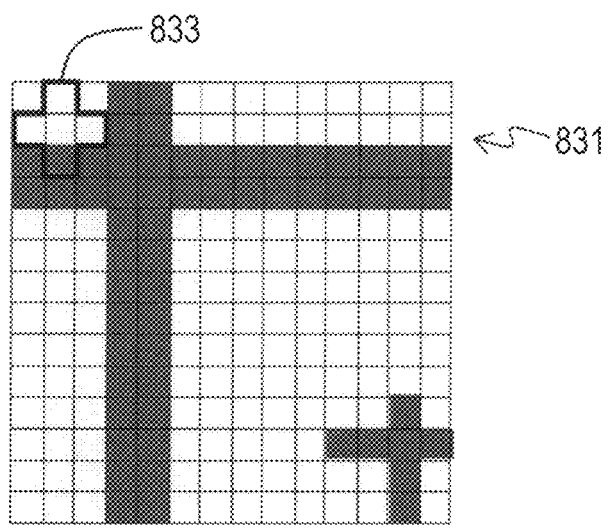
FIGS. 16A, 16B, and 16C are diagrams for explaining the details of a process for specifying a high congestion area according to a third embodiment.
Figure 16B:
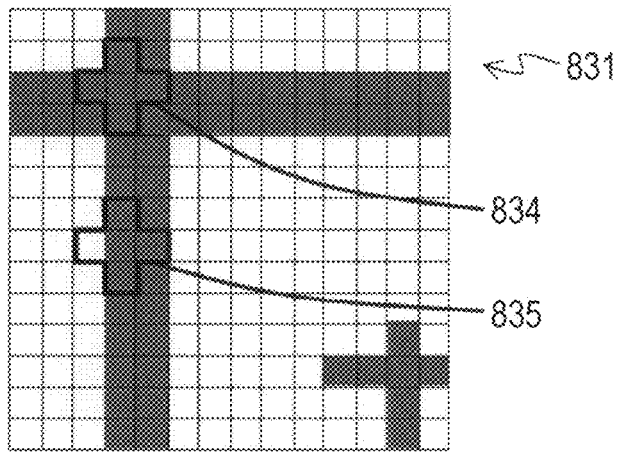
Figure 16C:
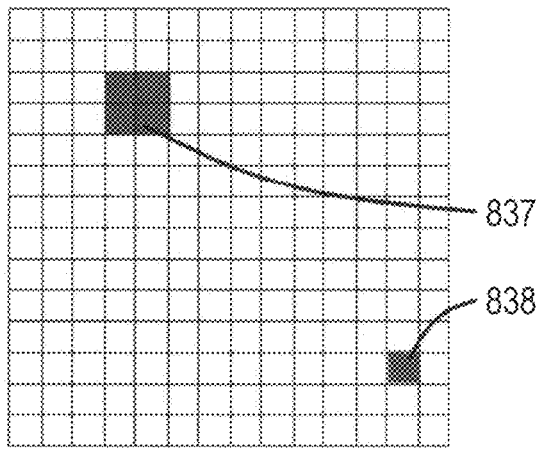

A third embodiment of the present invention will be described below. FIGS. 16A, 16B, and 16C are diagrams for explaining the details of a process for specifying a high congestion area according to a third embodiment. FIG. 16A is a diagram showing a grayscale image 831 to be scanned and a scanning window 833. FIG. 16B is a diagram showing a scanning window during scanning FIG. 16C is a diagram showing a high congestion area.

A procedure in which a CPU 51 scans the grayscale image 831 with the scanning window 833 will be described. The grayscale image 831 is constituted by two cross-shaped images. The scanning window 833 is a cross-shaped scanning window 833 constituted by five squares, and moves vertically and horizontally in units of one square.

The area ratio of the area having a density higher than a predetermined value at the position of a scanning window 834 is 100%, and the area ratio at the position of a scanning window 835 is 80%. The high congestion area in the third embodiment is an area obtained by combining the center squares of the scanning window at the positions where an area ratio higher than the predetermined value is 90%, and there are two high congestion areas (837 and 838). The density adjusting process in steps S35 to S37 in FIG. 6 is performed twice.

The divided area in the first embodiment and the scanning windows (the scanning window 823 in FIG. 15A and the scanning window 833 in FIG. 16A) in the second and third embodiments are rectangular or cross, but may be circle or other shapes or sizes. Furthermore, the high congestion area is not limited to the area obtained by combining divided areas or scanning windows at the positions where an area ratio having a density higher than a predetermined value or the average density satisfies a predetermined condition, and may be an area obtained by combining inner areas (partial areas) of the scanning window. As an example of the inner area of the scanning window, one square in the center of the cross shaped scanning window 833 is applicable.

Figure 17:
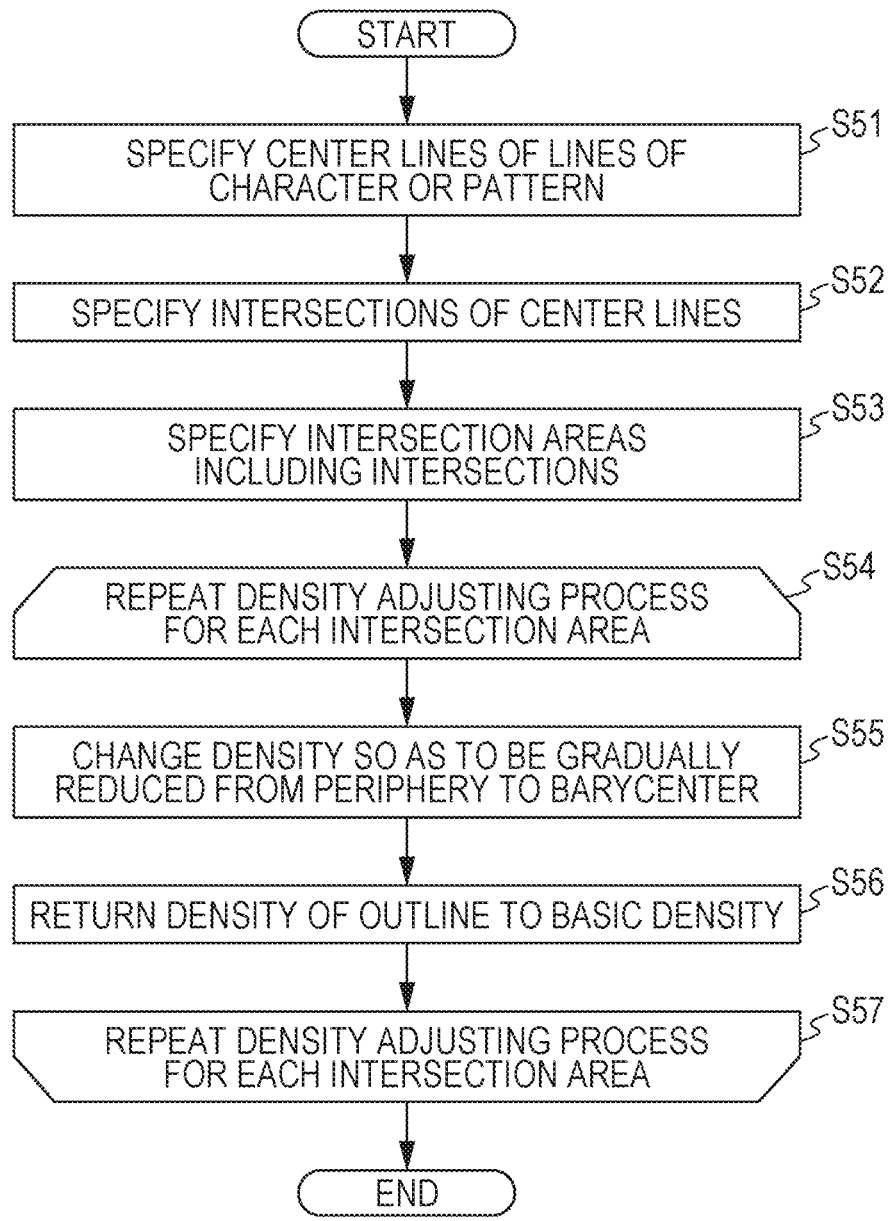
FIG. 17 is a flowchart showing an uneven expansion suppressing process according to a fourth embodiment.

The high congestion area in the uneven expansion suppressing process according to the above embodiment is the area obtained by combining divided areas or scanning windows satisfying a predetermined condition. As another embodiment, the density adjusting process is performed regarding an area in which the lines of characters, straight lines, ellipses intersect (hereinafter, also referred to as intersection area) as a high congestion area. With reference to FIGS. 17 to 18F, a fourth embodiment in which a high congestion area is specified by searching for an intersection and the density is adjusted will be described in detail.

FIG. 17 is a flowchart showing an uneven expansion suppressing process according to a fourth embodiment. FIGS. 18A, 18B, 18C, 18D, 18E, and 18F are diagrams for explaining a density adjusting process according to the fourth embodiment.

A CPU 51 regards patterns and characters included in a grayscale image as a collection of line images having a predetermined width, and specifies the center lines of the line image constituting each pattern and character (step S51). FIG. 18A is a diagram showing a character grayscale image 851 and its center line, in which the specified center lines are indicated by white solid lines. The center line is constituted by five connected components, and a center line 852 is the longest center line among the connected components. The process for specifying the center line can be achieved by existing image processing techniques such as thinning.

Next, the CPU 51 specifies the intersection of the center lines obtained in step S51 (step S52).

Then, the CPU 51 specifies the intersection area including the intersection specified in step S52 (step S53).

Next, the CPU 51 performs the density adjusting process in steps S55 and S56 to each intersection area specified in step S53 (step S54).

The CPU 51 changes the density of the intersection area specified in step S53 so that the density is gradually reduced from the periphery to the center (step S55). FIG. 18B is a diagram showing a grayscale image 861 in the vicinity of the intersection area including an intersection 853 after the density change. Similarly to the grayscale image 731 (see FIG. 14B), the intersection area is divided into two by one rectangle and the density is changed so as to be gradually reduced from the basic density of an outer side 864 of the intersection area toward the inside via an area sandwiched by the intersection area and the rectangle (the outer area of the intersection area) 863 and a rectangular area (the inner area of the intersection area) 862. In this density change, the intersection area is divided into two areas by one rectangle to use three density levels. However, the intersection area may be divided into more areas so that the density is gradually reduced from the outside to the inside.

Next, when the outline of the intersection area is the outline of the grayscale image 851 before the density change, the CPU 51 returns the outline having the predetermined width to the basic density (density at the outer side 864 of the intersection area) before the density change (step S55) (step S56). FIG. 18C is a diagram showing a grayscale image 865 in the vicinity of the intersection area after the density of the intersection area including the intersection 853 is changed and the density of the outline is returned. When compared to the grayscale image 861 after the density change, a right side (outline part) 866 of the outer outline of the outer area 863 of the intersection area returns to the basic density.

FIG. 18D is a graph showing the density of the line W-W' of the grayscale image 865. From the left, the densities of the outer side 864 of the intersection area, the outer area 863 of the intersection area, the inner area 862 of the intersection area, the outer area 863 of the intersection area, and the outline part 866 are changed.

After performing the process in steps S55 and S56 to all the intersection areas specified in step S53, the CPU 51 completes the entire process in FIG. 17 (step S57).

FIG. 18E is a diagram showing a grayscale image 867 in the vicinity of the intersection area when the inner area 862 of the intersection area is wide in the density change (step S55) and the outline processed in step S56 is wide. The right side of the outer area 863 of the intersection area is missing. The CPU 51 may adjust the density in this manner.

FIG. 18F shows a grayscale image 871 which is the grayscale image 851 subjected to the uneven expansion suppressing process. An area 872 encircled by a broken line corresponds to the grayscale image 865. An area 873 encircled by the other broken line includes a plurality of intersections, and a plurality of intersection areas overlap each other. When a plurality of intersection areas overlap each other, the CPU 51 does not repeatedly perform the density adjusting process (steps S55 and S56) to each intersection area, but regards the intersection areas as one intersection area collectively and performs the density adjusting process. The intersection area grouped into one in the area 873 encircled by the broken line is a hexagon, the intersection area is divided into two by a circle, and the density is changed so as to be gradually reduced in the order of an outer side 876 of the intersection area, an outer area 875 of the intersection area, and an inner area 874 of the intersection area.

With FIGS. 18A, 18B, 18C, 18D, 18E, and 18F, the density adjustment in which the grayscale image is regarded as a collection of line images constituting a character and the intersection area is regarded as a high congestion area has been described. Similar process is applicable to pattern lines such as straight lines and ellipses, in addition to characters. Furthermore, similar process is applicable to intersections of lines of straight lines, ellipses, and characters, in which lines such as straight lines and ellipses and characters overlap each other.

The line image is generated by converting, by the CPU 51, a straight line, an ellipse, and the like inputted by the user into the grayscale print data 41. Instead of specifying the center lines from the image and obtaining the intersection, the intersection may be obtained from coordinate information on the straight lines or the ellipses in the three-dimensional image data 4. This has an effect that process can be performed faster than the process for specifying an intersection from an image.

<<Other Modifications>>

In steps S37 and S56, the density of the outline is the basic density, but may be higher than the basic density. Furthermore, the CPU 51 may set the entire outline of the image such as a character, a straight line, or an ellipse to be higher than the density of the inside of the image as well as the outline of the area the density of which has been changed. By increasing the density of the outline, the outline of the expanded part is emphasized, and an emphasizing effect can be expected.

In the image 771 (see FIG. 8B) and the image 776 (see FIG. 9A), the density is changed by using concentric multi-gradation density levels (gradation), but the density may be changed by other shapes such as a rectangle in addition to a circle.

The process target of the CPU 51 is not limited to the grayscale image generated by the CPU 51. The uneven expansion suppressing process may be applied to an image created outside the three-dimensional image forming system 1.

In steps S23 to S25 in FIG. 4, the user sets the foamable sheet 2 on the image printing apparatus 6 and the foaming apparatus 7, but the user may not intervene by integrating both apparatuses or providing an automatic sheet feeding mechanism.

In the above embodiments, the pattern is a straight line, an ellipse, or a square, but is not necessarily limited thereto, and may be other patterns such as a triangle and a free curve. Furthermore, the CPU 51 may perform the uneven expansion suppressing process to the area in the image designated by the user, or perform the uneven expansion suppressing process to the area other than the designated area.

In the above embodiments, the grayscale image to be subjected to the uneven expansion suppressing process is the grayscale image printed on the back side of the foamable sheet 2, but may be the grayscale image printed on the front side.

Furthermore, the above uneven expansion suppressing process can be applied to an area in which lines having different designated foaming heights (basic densities) are congested (intersect). In this case, the CPU 51 processes the outline according to the basic density of each line (steps S37 and S56). Furthermore, the uneven expansion suppressing process may be applied to an area in which lines in an area having a certain density (lines overlapping each other in the area) are congested (intersected).

<<Effects>>

As described above, it is possible for the three-dimensional image forming system 1 to evenly foam a three-dimensional image constituted by characters and lines formed on the foamable sheet (thermally expandable sheet) 2 by suppressing excessive expansion of an area in which lines and intersections of the lines are congested or an intricate character having a large number of strokes. Thus, it is possible to form a three-dimensional image by editing the three-dimensional image data without being concerned about restrictions in design and failures in uneven foaming.

More specifically, by specifying, in a grayscale image that contributes to an area in which a foamable sheet is irradiated with light and heated to foam and bulge the foaming layer and a heating amount, a high congestion area which is an intersection area of lines, an intricate character, an area in which lines are congested, and gradually reducing the density of the grayscale image from the periphery to the center, it is possible to reduce the heating amount and suppress uneven expansion.

Furthermore, by not reducing the density of the outline of the grayscale image of characters and lines, it is possible to prevent the outline of a three-dimensional image of lines and characters from becoming dull.

The invention claimed is:

1. A three-dimensional image forming system comprising:
a hardware processor which, under control of a stored program, executes processes comprising:
   a high congestion area specifying process for specifying, in print data for printing a grayscale image used to thermally expand a desired area on a thermally expandable sheet, a high congestion area which is an area in which a congestion of a density pattern included in the grayscale image is higher than a predetermined value; and
   a density adjusting process for adjusting a density of the grayscale image such that an expanding height of the high congestion area reaches a desired height,
   wherein the desired height is a height which minimizes a difference of an expanding height corresponding to the density pattern between the high congestion area and a low congestion area which is an area excluding the high congestion area in the grayscale image.

2. The three-dimensional image forming system according to claim 1, wherein the density pattern is a pattern or a character constituted by a collection of line images.

3. The three-dimensional image forming system according to claim 1, wherein the high congestion area is one of (i) an area obtained by combining divided areas having a higher area ratio of an image, a density of the image being higher than a predetermined density, than a predetermined ratio in divided areas of the grayscale image, and (ii) an area obtained by combining divided areas having a higher average density than the predetermined density.

4. The three-dimensional image forming system according to claim 1, wherein the high congestion area is one of (i) an area obtained by combining inner areas of partial areas having a higher area ratio of an image, a density of the image being higher than a predetermined density, than a predetermined ratio in partial areas of a predetermined shape of the grayscale image, and (ii) an area obtained by combining inner areas of partial areas having a higher average density than the predetermined density.

5. The three-dimensional image forming system according to claim 1, wherein the density adjusting process changes the density of the grayscale image such that the density is lower toward a center part of the high congestion area.

6. The three-dimensional image forming system according to claim 5, wherein the density adjusting process changes the density of the grayscale image using a gradation of a circle corresponding to a size, an average density, or a density integrated value of the high congestion area.

7. The three-dimensional image forming system according to claim 5, wherein the density adjusting process does not change the density of an outline included in the grayscale image.

8. A non-transitory computer-readable recording medium that stores a program executable by a computer of a three-dimensional image forming system to execute processes comprising:
   a high congestion area specifying process for specifying, in print data for printing a grayscale image used to thermally expand a desired area on a thermally expandable sheet, a high congestion area which is an area having a higher congestion of a density pattern included in the grayscale image than a predetermined value; and
   a density adjusting process for adjusting a density of the grayscale image such that an expanding height of the high congestion area reaches a desired height,
   wherein the desired height is a height which minimizes a difference of an expanding height corresponding to the density pattern between the high congestion area and a low congestion area which is an area excluding the high congestion area in the grayscale image.

9. The computer-readable recording medium according to claim 8, wherein the density pattern is a pattern or a character constituted by a collection of line images.

10. The computer-readable recording medium according to claim 8, wherein the high congestion area is one of (i) an area obtained by combining divided areas having a higher area ratio of an image, a density of the image being higher than a predetermined density, than a predetermined ratio in divided areas of the grayscale image, and (ii) an area obtained by combining divided areas having a higher average density than the predetermined density.

11. The computer-readable recording medium according to claim 8, wherein the high congestion area is one of (i) an area obtained by combining inner areas of partial areas having a higher area ratio of an image, a density of the image being higher than a predetermined density, than a predetermined ratio in partial areas of a predetermined shape of the grayscale image, and (ii) an area obtained by combining inner areas of partial areas having a higher average density than the predetermined density.

12. The computer-readable recording medium according to claim 8, wherein the density of the grayscale image is changed in the density adjusting process such that the density is lower toward a center part of the high congestion area.

13. The computer-readable recording medium according to claim 12, wherein the density of the grayscale image is changed in the density adjusting process using a gradation of a circle corresponding to a size, an average density, or a density integrated value of the high congestion area.

14. The computer-readable recording medium according to claim 12, wherein the density of an outline included in the grayscale image is not changed in the density adjusting process.

* * * * *